(12) United States Patent
Bhattacharjee et al.

(10) Patent No.: US 11,895,674 B2
(45) Date of Patent: Feb. 6, 2024

(54) SYSTEMS AND METHODS FOR SMART BROADCAST FOR MULTICAST COMMUNICATION OVER AN IP-BASED TDMA NETWORK

(71) Applicant: Safran Passenger Innovations, LLC, Brea, CA (US)

(72) Inventors: Sushmit Bhattacharjee, Brea, CA (US); Steven Lemaire, Brea, CA (US); Tinku Rasheed, Gilching (DE)

(73) Assignee: Safran Passenger Innovations, LLC, Brea, CA (US)

( * ) Notice: Subject to any disclaimer, the term of this patent is extended or adjusted under 35 U.S.C. 154(b) by 38 days.

(21) Appl. No.: 17/630,094

(22) PCT Filed: Jul. 30, 2020

(86) PCT No.: PCT/US2020/044318
§ 371 (c)(1),
(2) Date: Jan. 25, 2022

(87) PCT Pub. No.: WO2021/022077
PCT Pub. Date: Feb. 4, 2021

(65) Prior Publication Data
US 2022/0279441 A1    Sep. 1, 2022

Related U.S. Application Data (60) Provisional application No. 62/880,355, filed on Jul. 30, 2019.

(51) Int. Cl.
*H04W 72/00* (2023.01)
*H04W 72/30* (2023.01)
(Continued)

(52) U.S. Cl.
CPC ......... *H04W 72/30* (2023.01); *H04W 52/028* (2013.01); *H04W 52/0216* (2013.01);
(Continued)

(58) Field of Classification Search
CPC ......... H04W 52/0216; H04W 52/0219; H04W 52/0229; H04W 52/0235; H04W 52/028;
(Continued)

(56) References Cited

U.S. PATENT DOCUMENTS

| 5,608,726 A | * | 3/1997 | Virgile | ................ H04L 12/1886 |
| | | | | 370/401 |
| 6,112,323 A | * | 8/2000 | Meizlik | .................... H04L 1/188 |
| | | | | 714/748 |
| 2022/0256503 A1 | * | 8/2022 | Bhattacharjee | ....... H04W 72/21 |

FOREIGN PATENT DOCUMENTS

| CN | 101662798 A | 3/2010 |
| CN | 102946298 A | 2/2013 |

OTHER PUBLICATIONS

China Patent Office, First Office Action, dated Sep. 19, 2023.

* cited by examiner

*Primary Examiner* — Phuc H Tran
(74) *Attorney, Agent, or Firm* — Umberg Zipser LLP; Ryan Dean (57) ABSTRACT

Systems, processes and methods are described for increasing the reliability of packet delivery while reducing end-to-end latency and power consumption in a low power wireless network. The packet is forwarded during a transmit timeslot utilizing link layer broadcast transmissions. A preset number of retransmission timeslots are provided to retransmit the packet. To reduce energy consumption for recipients, a recipient can enter a sleep mode after receiving the packet for the remaining retransmit timeslots.

18 Claims, 6 Drawing Sheets

(51) Int. Cl.
  *H04W 52/02*    (2009.01)
  *H04W 72/0446*  (2023.01)
  *H04W 72/21*    (2023.01)
(52) U.S. Cl.
  CPC ... *H04W 52/0219* (2013.01); *H04W 52/0229* (2013.01); *H04W 52/0235* (2013.01); *H04W 72/0446* (2013.01); *H04W 72/21* (2023.01)
(58) Field of Classification Search
  CPC .. H04W 72/0446; H04W 72/21; H04W 72/30
  See application file for complete search history.

- Classical Broadcast:

SYSTEMS AND METHODS FOR SMART BROADCAST FOR MULTICAST COMMUNICATION OVER AN IP-BASED TDMA NETWORK

This application claims priority to U.S. provisional patent application having Ser. No. 62/880,355 filed on Jul. 30, 2019. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is multicast communication, such as for use in intra-vehicular wireless sensor networks, Internet of Things, home automation, and low-power devices, for example.

BACKGROUND

The following description includes information that may be useful in understanding the present invention. It is not an admission that any of the information provided herein is prior art or relevant to the presently claimed invention, or that any publication specifically or implicitly referenced is prior art.

Currently, there is an increasing demand for new applications of wireless sensor networks (WSNs). One exemplary area of application concerns in-vehicle communications, especially for aircrafts. As aircraft systems are becoming more and more connected, additional sensors are being employed in the aircraft to determine a status and health of seats, electronic equipment, and other components. With these increasing demands for new applications, it is useful to connect WSNs to the Internet via an Internet Protocol (IP) addressing, and specifically via Internet Protocol version 6 (IPv6) and future protocols, to achieve all-IP communication and thus, achieve interoperability.

However, current standards including IEEE 802.15.4 do not natively support multicast. Instead, algorithms have been developed that utilize link layer unicast transmission or link layer broadcast transmission to achieve IP multicast. One of the main differences between unicast and broadcast mode of communication is the reliability. In case of unicast transmission, the sender receives an acknowledgement from the destination upon the successful delivery of the packet. However, broadcast communication does not provide this feature.

In a link layer unicast transmission, a duplicate is created for each subscriber and needs to be delivered individually to all the subscribers. This is both time and energy consuming. On the other hand, in a link layer broadcast transmission, a packet is sent out to all the subscribers once with no duplicates created. Hence, a link layer broadcast transmission saves energy and end-to-end latency compared to link layer unicast transmission especially in case of multiple subscribers. However, broadcast communication suffers from reliability issues.

For example, bidirectional multicast RPL forwarding (BMRF) has been implemented, which uses both link layer unicast and broadcast transmissions based on the number of interested subscribers. A more detailed description of BMRF can be found in the article entitled "BMRF: Bidirectional Multicast RPL Forwarding" by Lorente et al., published in Ad Hoc Networks in 2017.

Figure 1:
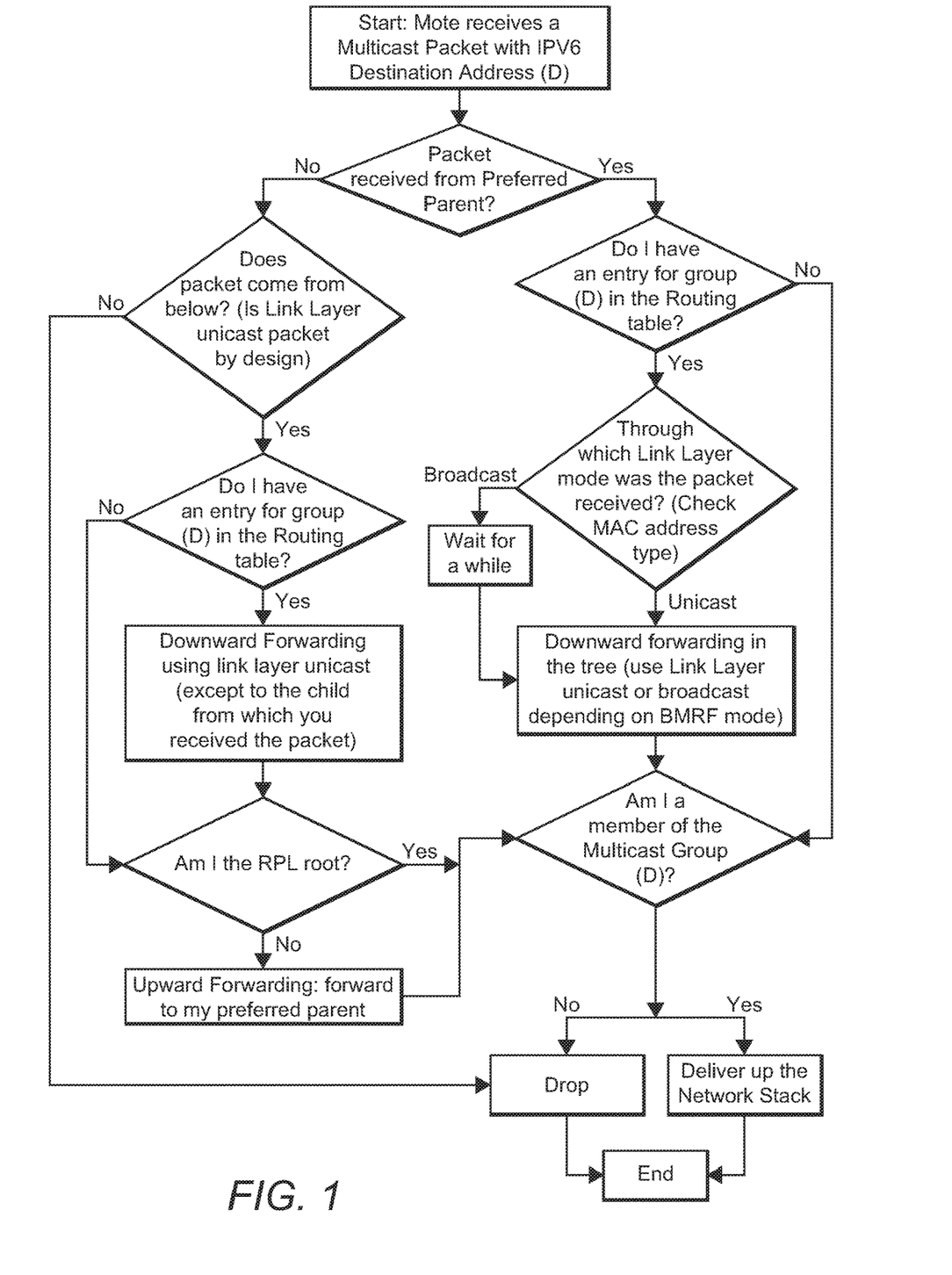
FIG. 1 illustrates a flowchart for packet forwarding using Bidirectional Multicast RPL Forwarding.

In BMRF, the multicast packets can traverse both up and down the RPL tree. An example of BMRF is shown in FIG. 1. Unlike Enhanced Stateless Multicast RPL Forwarding (ESMRF) described below, the multicast packet does not have to traverse all the way to the root. All the motes (sensors) in the network are aware of the topology. Thus, a multicast source can be anywhere within the network. BMRF has shown improvement in energy consumption, number of radio transmissions and end-to-end delay compared to the previous algorithms. The main idea is to choose between unicast and broadcast at the link layer based on the number of interested children and the duty cycle rate.

BMRF is disadvantageous as it uses the ContikiMAC algorithm for its radio duty cycling (RDC) and has IEEE 802.15.4 with Carrier Sense Multiple Access (CSMA) as its physical and Medium Access Control (MAC) layer. CSMA in general is non-deterministic. BMRF can also result in additional delay necessary to avoid collisions such as when waiting for a clear channel if link layer broadcast is used. In addition, if there is less interested children, bandwidth and energy are wasted. BMRF is also prone to cross-technology interference with various other technologies such as cordless phones, Wi-Fi™, Zigbee™, Bluetooth™, and microwave ovens using the 2.4 GHz Industrial Scientific Medical (ISM) band.

Others have utilized Multicast Protocol for Low-Power and Lossy Networks (MPL), which is described in the article "Multicast Protocol For Low-Power And Lossy Networks (MPL)" by Kelsey et al., published in IETF in 2016. MPL involves controlled network-wide flooding which is governed by Trickle timers. Trickle is a mechanism that propagates state information efficiently in a periodic manner. See Levis et al., "Trickle: A Self regulating Algorithm For Code Propagation And Maintenance In Wireless Sensor Networks", In Proc. of the 1st USENIX/ACM Symp. on Networked Systems Design and Implementation, 2004; and Levis et al., "The Trickle Algorithm", IETF, Fremont, CA, Technical report, USA: RFC 6206, 2011.

In MPL, all the motes (sensors) in the network receive the multicast packet irrespective of an interest for the packet. Then each mote (sensor) disseminates the multicast packet to its neighbors. These multicast packets need to be buffered to keep a track of whether a specific multicast packet was previously received. To help ensure that packets are received by all motes, the Trickle timer is used to schedule periodic re-transmission of these buffered packets.

MPL is disadvantageous for both energy and bandwidth efficiency. Because of the controlled network-wide flooding of a packet, all the motes (sensors) in the network receives the multicast packet which increases the communication overhead. Control packets also need to be disseminated regularly throughout the network to keep track of the buffer state, which adds further to the communication overhead. The motes (sensors) also must maintain two trickle timers to handle the buffered packets and control messages, which increases the overall complexity, code-size, and memory requirements.

Because all of the packets are buffered, the transmissions occupy a lot of memory. This can be problematics as the motes (sensors) generally have a limited memory, which restricts the number of packets that can be buffered and directly effects the efficiency of MPL.

Figure 2:
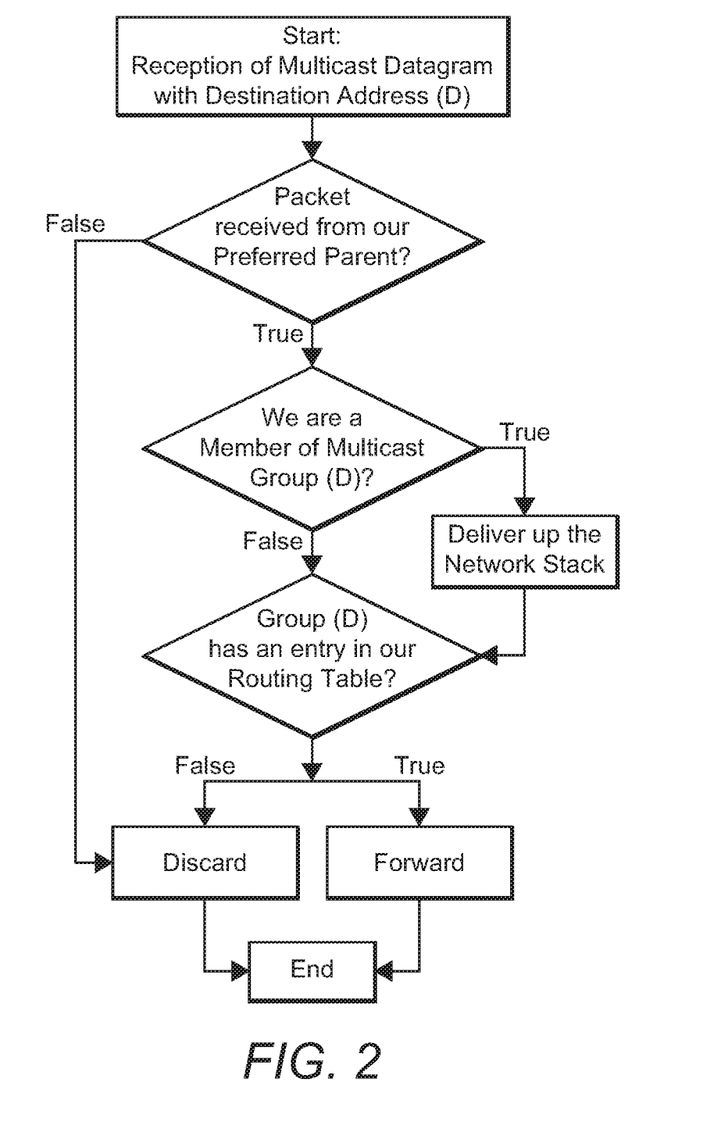
FIG. 2 illustrates a flowchart for packet forwarding using Stateless Multicast RPL Forwarding.

Another example is Stateless Multicast RPL Forwarding (SMRF), which is described in "Stateless Multicast Forwarding With RPL In 6LoWPAN Sensor Networks" by Oikonomou et al., published at In Pervasive Computing and Communications Workshops (PERCOM Workshops), 2012 IEEE International Conference in 2012, as well as "IPV6 Multicast Forwarding In RPL-Based Wireless Sensor Networks" by Oikonomou et al., published in Wireless personal communications in 2013. As shown in FIG. 2, SMRF only supports downward traffic because it enforces a preferred parent check before accepting a message. Hence, the source of a multicast communication is restricted to the root of the RPL tree. In other words, no other mote (sensor) in the low power and lossy network (LLN) can be a source.

To avoid collisions, the receiving mote (sensor) must wait for an additional period before the mote can forward the message. This results in high end-to-end latency. Furthermore, if the number of interested children is small, link layer broadcast transmission may not be the most efficient way in terms of energy. Many uninterested children would end up receiving the multicast messages.

Figure 3:
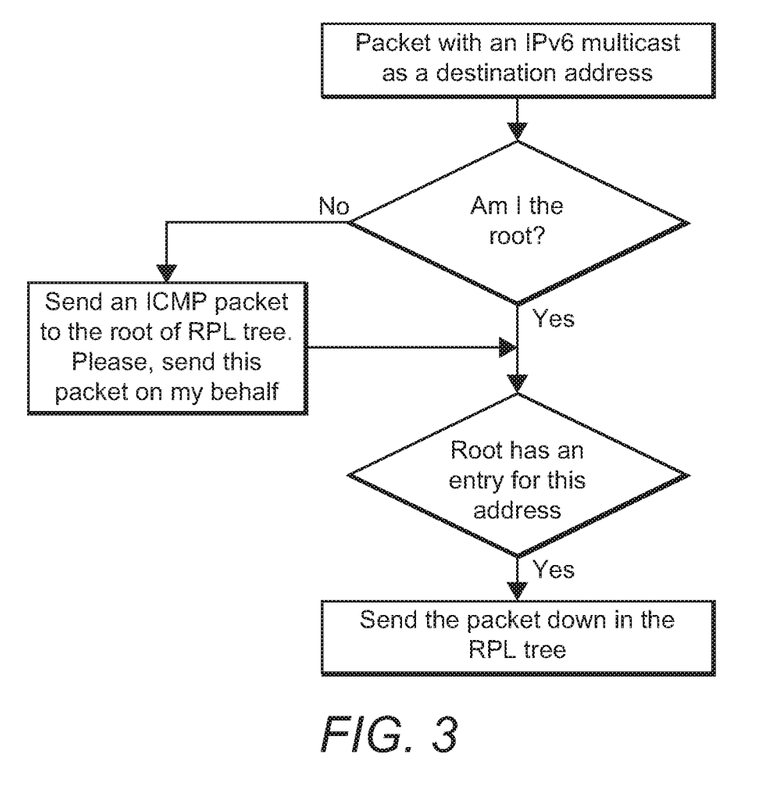
FIG. 3 illustrates a flowchart for packet forwarding using Enhanced Stateless Multicast RPL Forwarding.

A further example is ESMRF, which is described in "ESMRF: Enhanced Stateless Multicast RPL Forwarding For IPV6-Based Low-Power And Lossy Networks" by Fadeel et al., published in In Proceedings of the 2015 Workshop on IoT challenges in Mobile and Industrial Systems in 2015. As shown in FIG. 3, ESMRF is disadvantageous because the multicast packet needs to traverse all the way to the root even if the DODAG tree is large and if the multicast sources and their associated group members are in each other's vicinity. This decreases the communication efficiency. The structure also creates a bottleneck at the DODAG root, especially if the DODAG tree consists of several hundred nodes. This can also create a single point of failure at the DODAG root.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for systems and methods for multicast communication using an low-power wireless network that limit the potential for duplicate packets while saving bandwidth and energy.

SUMMARY OF THE INVENTION

The inventive subject matter provides apparatus, systems and methods in which low-power wireless personal area networks (6LoWPAN) can be implemented that utilize IPv6 address space to overcome the problems identified above that occur when scaling in device addressing. To improve communication efficiency and bandwidth and energy usage, the system and methods described herein utilize multicast forwarding techniques, which reduce communication overhead.

In general, multicast communication utilizes unicast transmissions on layer 3 (L3) or broadcast transmissions on the link layer (L2). In low-power wireless personal area networks, the protocol in the link layer (L2) is IEEE 802.15.4, and the protocol in the network layer (L3) adopts IPv6.

It should to be understood that, while the systems and methods disclosed herein are described in connection with the IEEE 802.15.4 protocol, it is contemplated that the systems and methods disclosed herein could be used with later-developed protocols where reallocation of transmissions to subscribers of a multicast group can reduce end-to-end latency.

A main difference between unicast and broadcast transmissions is reliability. In a unicast transmission, the sender receives an acknowledgement from the destination upon successful delivery of the packet. However, broadcast communication does not provide this feature. In terms of multicast communication, in case of a link layer unicast transmission, a duplicate is created for each of the subscribers and needs to be delivered individually to all the subscribers. This is both time and energy consuming. On the other hand, in a link layer broadcast transmission, a packet is sent out to all the subscribers once. No duplicates are created, and it is a one-time transmission. Hence, a link layer broadcast transmission saves a lot of energy and has a far lesser end-to-end latency compared to link layer unicast transmission especially in case of multiple subscribers. However, as mentioned earlier, broadcast communication suffers from reliability issues.

Preferred embodiments utilize a modified BMRF algorithm that provides an ability to choose between link layer unicast or broadcast communication. Time Slotted Channel hopping (TSCH) is utilized at the Medium Access Control (MAC) layer instead of CSMA/CA used by BMRF to provide a deterministic solution, decrease end-to-end latency, and reduce or eliminate cross-technology interference.

To improve the reliability of link layer broadcast transmissions, Time Division Multiple Access (TDMA) can be used to provide broadcast re-transmissions. In this manner, instead of transmitting once, a packet would be retransmitted multiple times as is the case with link layer unicast transmission. Because there are no acknowledgements in broadcast transmissions, the packet will always be retransmitted multiple times. However, to save energy, in case of a receiver, if a packet is received successfully via the broadcast mode, the remaining slots where the broadcast re-transmissions can be received are set to sleep mode. Thus, on the receiver's side, the mote would enter sleep mode right after receiving the very first packet and the subsequent re-transmissions would be ignored.

The inventive subject matter described herein has various applications. In an aircraft setting, for example, in-vehicle sensors could be divided into separate multicast groups. In such an environment, galleys could form a first multicast group, each seat class could form separate multicast groups, and on-board trolleys could be formed as separate multicast groups.

Multicast groups could also be formed based on applications. For example, oxygen mask release at the passenger service unit could form a separate group.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, references may be made regarding access points, routers, servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, an access point or router can have a processor including one or more cores, and a non-transitory computer-readable storage medium, where a program is stored in the medium to execute operations or otherwise fulfill preprogrammed roles, responsibilities, or functions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Systems, processes and methods are described below are provided for power saving in a wireless communication network, where packet recipients can enter a sleep mode in which they do not receive the retransmitted packet to reduce power consumption. The inventive broadcast transmission algorithm overcomes the challenges faced the traditional broadcast mode and addresses the requirements of wireless sensors for low power and lossy networks. It substantially reduces end-to-end latency while reducing energy requirements as compared to unicast mode and to the previous research efforts described above.

Figure 4:
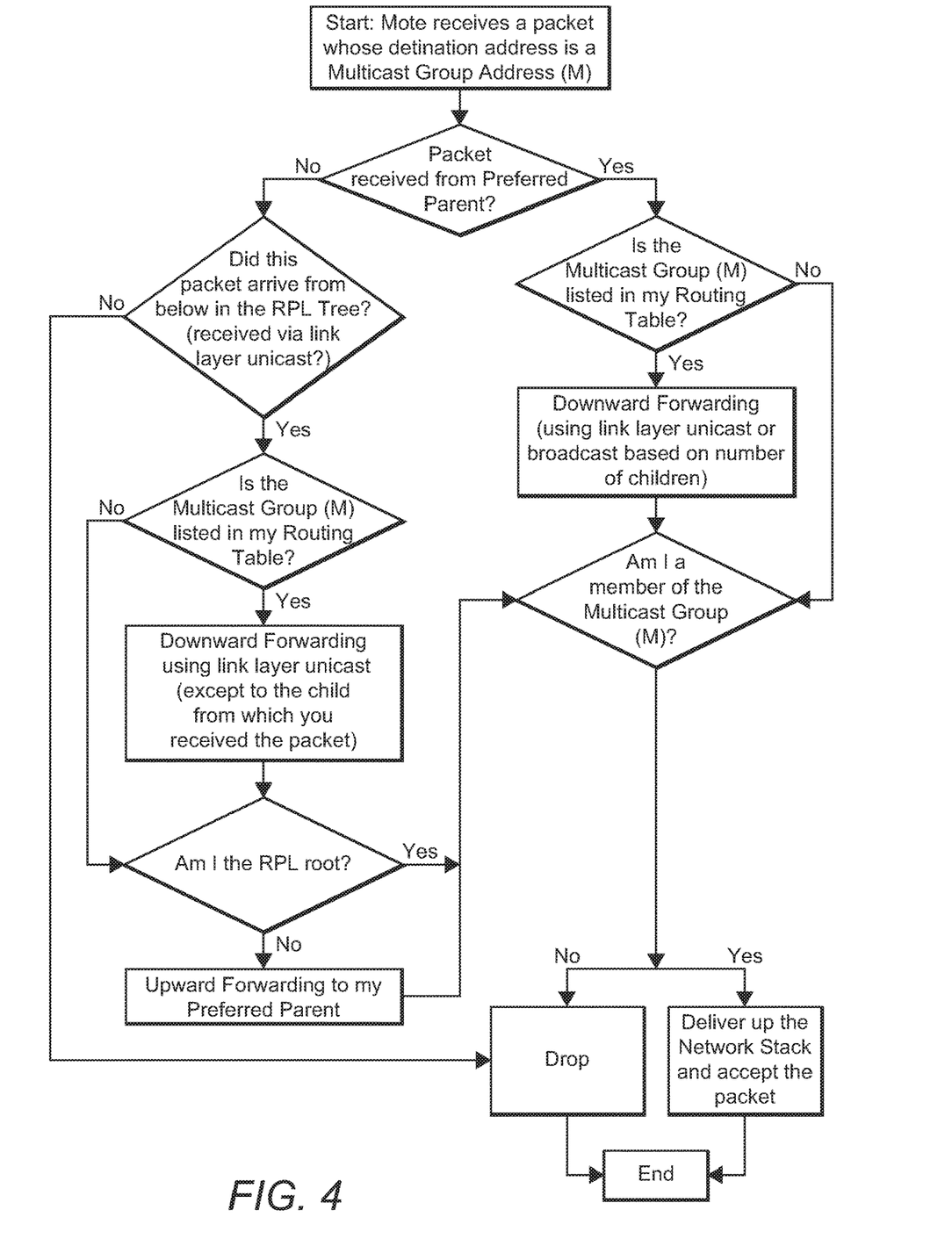
FIG. 4 illustrates a flowchart for one embodiment of a method for forwarding packets using broadcast transmission.

FIG. 4 illustrates an exemplary process for forwarding packets. As shown, a node (node and mote are used interchangeably herein to represent devices in the wireless sensor network) receives a packet whose destination is a multicast group address, and it is determined whether the packet was received from a preferred parent.

If the packet was received from a preferred parent, it is checked whether the multicast group is listed in the routing table. If so, the packet is forwarded downward using a link layer unicast or broadcast transmission based on the number of children and then it is checked whether the mote is a member of the multicast group. If the multicast group is not listed in the routing table, the packet is not forwarded and it is checked whether the mote is a member of the multicast group.

If the mote is a member of the multicast group, the packet is delivered up the network stack and the packet is accepted. If not, the packet is dropped.

If the packet was not received from a preferred parent, it is checked whether the packet arrived from below in the RPL tree (i.e. received from a link layer unicast transmission). If yes, it is checked whether the multicast group is listed in the routing table. If not, the packet is dropped.

If the multicast group is listed in the routing table, the packet is forwarded downward using link layer unicast, except to the child from which the packet was received. It is then checked whether the mote is the RPL root. If so, it is checked if the mote is a member of the multicast group. If not, the packet is forwarded upward to the preferred parent.

If the mote is a member of the multicast group, the packet is delivered up the network stack and the packet is accepted. If not, the packet is dropped.

Figure 5:
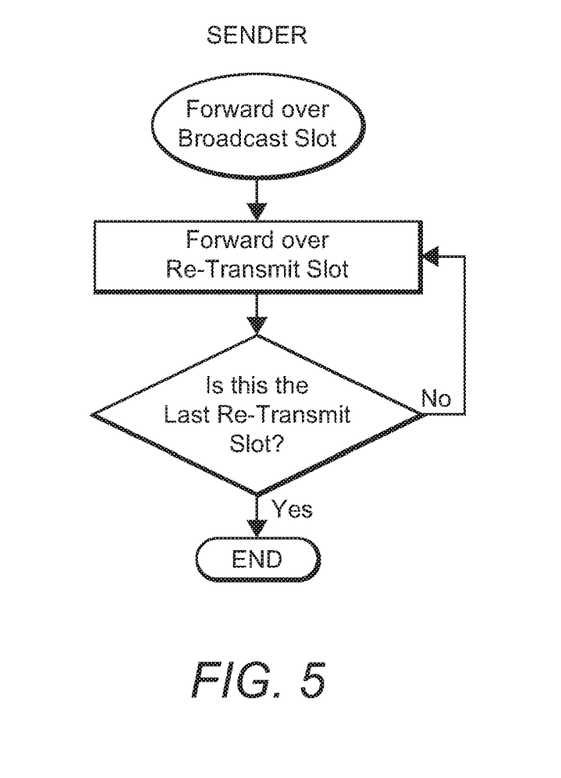
FIG. 5 illustrates a flowchart for one embodiment of a method for transmission of a packet from a sender.
Figure 8:
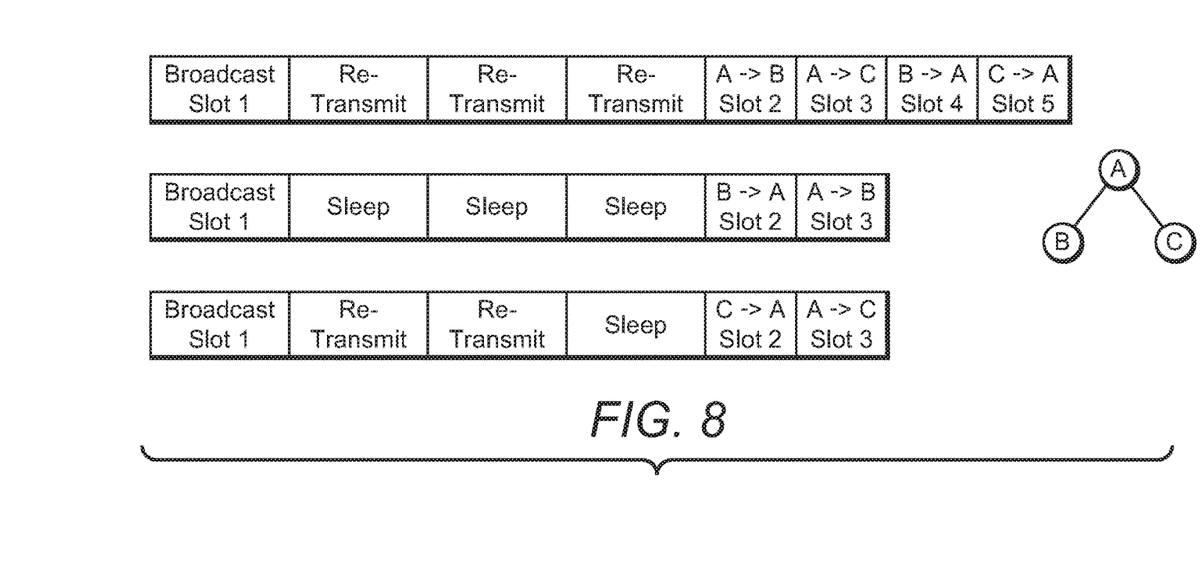
FIG. 8 illustrates an example of an embodiment of a smart broadcast transmission method.

In FIG. 5, one embodiment of a smart broadcast transmission method or process is shown, which preferably occurs over a low power wireless personal area network using time division multiple access (TDMA). In such embodiments, it is contemplated that one device periodically transmits a beacon frame, which could be the access point or other device, for example. The beacon frame provides a timing structure through the division of time into super frames, which allows motes to synchronize with the beacon and know when transmit and retransmit slots occur. Each super frame preferably includes a transmit (broadcast) slot and a preset number of retransmit slots, such as shown in FIG. 8.

The timeslots in TDMA can be classified according to functionality. There are timeslots that are new timeslots specifically for transmitting and receiving broadcast retransmissions. In case of a sender these timeslots would always be used to retransmit. However, to save energy, in case of a receiver, if a packet is received successfully via broadcast transmission, the remaining timeslots where the broadcast retransmissions can be received are set to sleep mode. Thus, on the receiver's side, the mote would enter sleep mode right after receiving the very first packet and the subsequent retransmissions would be ignored. Adding multiple re-transmissions for the broadcast mode increases the probability of a packet being successfully received at the destination. This coupled with the reduced end-to-end latency of a broadcast transmission makes it superior to the prior concepts described above.

In the contemplated systems, processes and methods, a received packet is forwarded (transmitted) to one or more recipients, and preferably a plurality of motes, using a link layer broadcast transmission.

The same packet is then forwarded over a retransmit timeslot to the one or more recipients using the link layer broadcast transmission until the total number of transmissions of the packet to the one or more recipients equals a preset integer. It is contemplated that the number of retransmit slots could be between one and then, and more preferably between four and six, for example. Although the specific number will likely vary depending on one or more of the number of recipients, the importance of the packet, the network topology and so forth. Once the last retransmit slot is used, the process completes.

Figure 6:
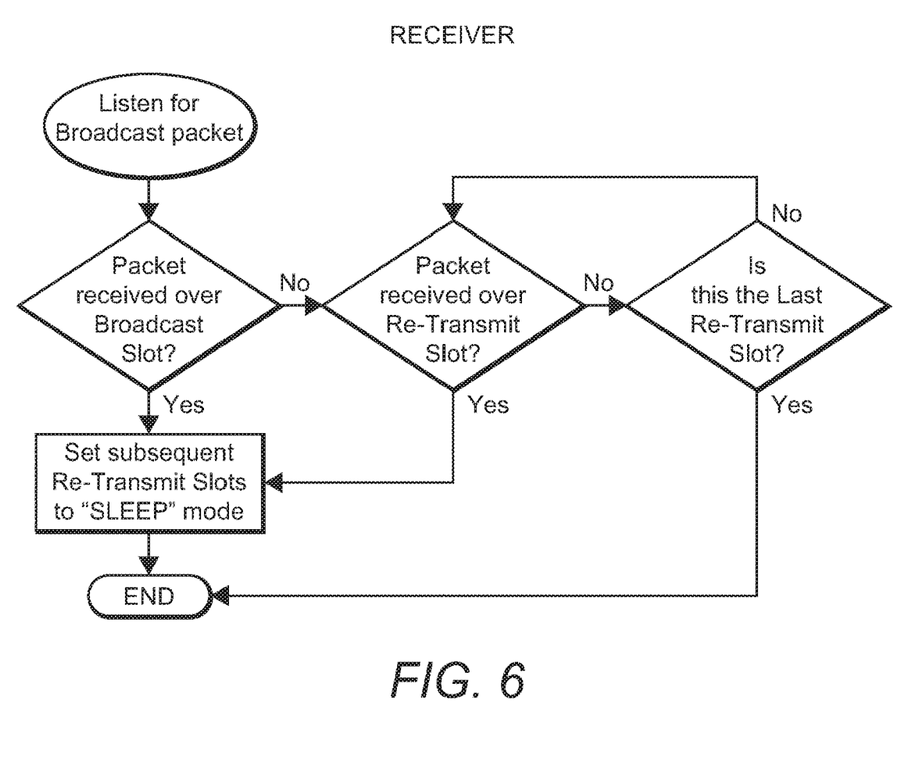
FIG. 6 illustrates a flowchart for one embodiment of a method for receiving a packet.

As shown in FIG. 6, each recipient of the packet is configured to listen for the broadcast packet from the sender according to known timeslots for transmission and retransmission. If the packet is not received, the recipient checks whether the packet is received over a retransmit slot. This process continues until either (i) the last retransmit slot for the packet or (ii) the packet is received, whichever comes first.

Using the feature of time being divided into timeslots by TDMA, such as shown in FIG. 8, if the packet is received prior to the last retransmit slot, the recipient sets subsequent retransmit slots meant for the reception of broadcast retransmissions for that packet to sleep mode. Thus, on the receiver's side, the mote would enter sleep mode right after receiving the very first packet and the subsequent retransmissions would be ignored. This advantageously decreases energy consumption.

Figure 7:
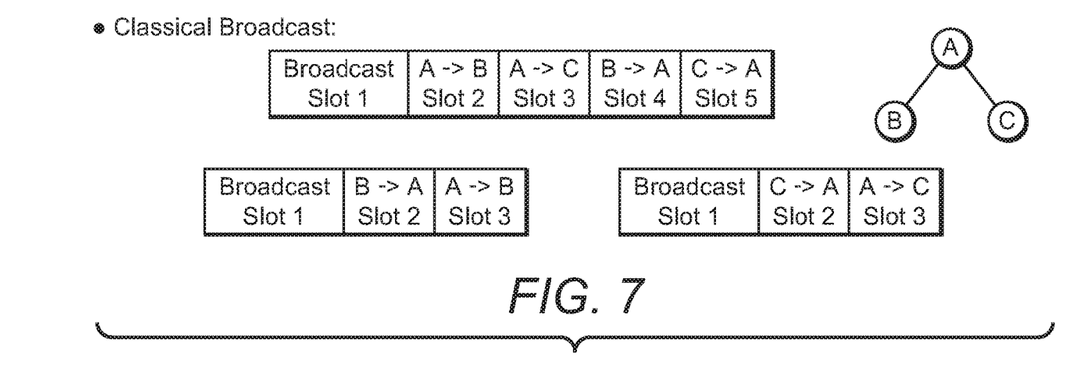
FIG. 7 illustrates an example of a traditional broadcast transmission method.

The inventive concepts are further shown by comparing FIG. 7 with FIG. 8.

In traditional broadcast methods shown in FIG. 7, a packet is transmitted to a plurality of motes in a single timeslot. Especially where there are larger numbers of recipients, the broadcast transmission typically significantly reduces end-to-end latency and energy consumption. However, as compared with unicast transmission, broadcast transmission generally has a lower reliability because, unlike in unicast transmission, the recipients do not provide an acknowledgment when they receive the packet.

In one test, the inventors found a perfect Packet Delivery Ratio (PDR) of 100% in unicast transmission compared with a PDR of 78% reliability in broadcast transmission. However, the end-to-end latency in case of the broadcast transmission was almost 30% less than that of unicast transmission. In addition, the number of radio transmissions were double in the unicast transmission example, which indicates increased energy consumption.

To improve the reliability of broadcast transmissions, the systems, methods and processes allows retransmissions of the packet in link layer broadcast transmission. Since, broadcast transmission does not have an acknowledgment feature, the sender always retransmits a packet multiple times to increase reliability. By retransmitting packets, the reliability of the broadcast transmission is greatly improved and was shown to be comparable to that of the unicast mode. Specifically, the inventors found a PDR of 99% in broadcast transmission compared with a PDR of 100% for unicast transmission.

Even though a sender always retransmits a packet multiple times irrespective of whether the packet was successfully delivered, the number of radio transmissions can still be less than that of unicast transmission in case of multiple multicast subscribers. Preferably, the number of transmissions in the broadcast transmission is limited to a fixed value compared to the traditional broadcast transmissions and this number remains the same irrespective of the number of subscribers.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A program stored in non-transitory computer-readable storage medium, wherein the program executes the following operations for multicast communication over an IP network when the program is executed by one or more processors of a router, wherein the role of the router can be taken up by any mote that is part of the network topology, the operations comprising:

receiving a packet at a mote;

transmitting the packet to one or more recipients using a link layer broadcast transmission;

if the packet is not received by the one or more recipients, comparing a number of transmissions of the packet with a preset integer, wherein the preset integer represents a number of retransmission timeslots;

if the number of transmissions of the packet is less than the preset integer, re-transmitting the packet to the one or more recipients using the link layer broadcast transmission until the total number of transmissions of the packet to the one or more recipients equals the preset integer, wherein each of the one or more recipients has a set of timeslots where the packet can be received; and upon receipt of the transmitted packet by a recipient, being one of the one or more recipients, scheduling, for that recipient, each of the remaining timeslots of the set of timeslots to a sleep mode.

2. The program of claim 1, the operations further comprising:

determining whether an origin of the received packet having a multicast group address is a preferred parent of the mote;

if the origin is the preferred parent, the router checking whether the multicast group address is listed in a routing table of the router;

if the origin is not the preferred parent, dropping the packet;

only if the multicast group address is listed in the routing table, the router forwarding the packet downward using a link layer unicast transmission or the link layer broadcast transmission as a function of the number of children;

after determining whether the multicast group address is listed in the routing table, the router checking whether the mote is a member of the multicast group; and if the router determines that the mote is the member of the multicast group, delivering the packet upward.

3. The program of claim 2, the operations further comprising:

if the origin is not the preferred parent, the router checking whether the packet was received from below;

if the router determines the packet was received from below, the router determining whether the multicast group address is listed in the routing table;

if the router determines the packet was not received from below, dropping the packet;

if the multicast group address is listed in the routing table, the router forwarding the packet downward using a link layer unicast transmission, but not forwarding the packet to the child from which the packet was received;

determining using the router whether the mote is a root of the network topology;

if the mote is the root of the RPL network, determining whether the mote is a member of a multicast group of the packet; and if the mote is not the root of the RPL network, forwarding the packet upward to the preferred parent.

4. The program of claim 3, the operations further comprising:

if the mote is the member of the multicast group, forwarding the packet upward, and if not, dropping the packet.

5. The program of claim 1, wherein a greater value of the predetermined threshold equals a greater reliability of each of the one or more recipients receiving the packet.

6. The program of claim 1, wherein the transmission occurs over a low-power wireless personal area network.

7. The program of claim 1, wherein the transmission and receipt of the packet utilizes time division multiple access.

8. A system configured for multicast communication over an IP network between motes, comprising:

a router having a processor including one or more cores, and a memory;

wherein a first mote is configured to receive a packet, and transmit the packet to one or more recipients using a link layer broadcast transmission;

wherein, if the packet is not received by the one or more recipients, the first mote compares a number of transmissions of the packet with a preset integer, wherein the preset integer represents a number of retransmission timeslots;

wherein, if the number of transmissions of the packet is less than the preset integer, the first mote is further configured to retransmit the packet to the one or more recipients using the link layer broadcast transmission until the total number of retransmissions of the packet to the one or more recipients equals the preset integer;

a second mote, being one of the one or more recipients, which received the transmitted packet using the link layer broadcast transmission, configured to receive the packet from the first mote, and upon receipt, scheduling any remaining timeslots for receiving retransmission of the packet to a sleep mode.

9. The system of claim 8, wherein the router is further configured to determine whether an origin of the received packet having a multicast group address is a preferred parent of the first mote;

if the origin is the preferred parent, the router checking whether the multicast group address is listed in a routing table of the router;

if the origin is not the preferred parent, dropping the packet;

only if the multicast group address is listed in the routing table, the router forwarding the packet downward using a link layer unicast transmission or the link layer broadcast transmission as a function of the number of children;

after determining whether the multicast group address is listed in the routing table, the router checking whether the first mote is a member of the multicast group; and if the router determines that the first mote is the member of the multicast group, delivering the packet upward.

10. The system of claim 9, wherein the router is further configured to:

check whether the packet was received from below if the origin is not the preferred parent;

determine whether the multicast group address is listed in the routing table if the packet was received from below;

drop the packet if the packet was not received from below;

transmit the packet downward using the link layer unicast transmission, but not forwarding the packet to the child from which the packet was received, if the multicast group address is listed in the routing table;

determine whether the mote is a root of the RPL network;

if the mote is the root of the RPL network, determine whether the mote is a member of a multicast group of the packet; and if the mote is not the root of the RPL network, transmit the packet upward to the preferred parent.

11. The system of claim 10, the router is further configured to:
if the mote is the member of the multicast group, transmit the packet upward, and if not, drop the packet.

12. The system of claim 8, wherein the predetermined threshold is between four and six, inclusive.

13. The system of claim 8, wherein the transmission occurs over a low-power wireless personal area network.

14. The system of claim 8, wherein the transmission and receipt of the packet utilizes time division multiple access.

15. A method for multicast communication over an IP network using a router, comprising:
receiving a packet at a mote;
transmitting the packet to one or more recipients using a link layer broadcast transmission;
if the packet is not received by the one or more recipients, comparing a number of transmissions of the packet with a preset integer, wherein the preset integer represents a number of retransmission timeslots;
if the number of transmissions of the packet is less than the preset integer, re-transmitting the packet to the one or more recipients using the link layer broadcast transmission until the total number of transmissions of the packet to the one or more recipients equals the preset integer, wherein each of the one or more recipients has a set of timeslots where the packet can be received; and
upon receipt of the transmitted packet by a recipient, being one of the one or more recipients, scheduling, for that recipient, each of the remaining timeslots of the set of timeslots to a sleep mode.

16. The method of claim 15, wherein the predetermined threshold is between four and six, inclusive.

17. The method of claim 15, wherein the transmission occurs over a low-power wireless personal area network.

18. The method of claim 15, wherein the transmission and receipt of the packet utilizes time division multiple access.

* * * * *